Sept. 12, 1967     J. F. BRINSTER ETAL     3,341,726
ROTATING BEARING CONTACTS FOR ELECTRICAL COMMUTATORS
Filed March 29, 1965     2 Sheets-Sheet 1

INVENTORS.
JOHN F. BRINSTER
CHARLES J. DIGNEY
BY
*Ralph K. Bonell*
AGENT

Sept. 12, 1967     J. F. BRINSTER ETAL     3,341,726
ROTATING BEARING CONTACTS FOR ELECTRICAL COMMUTATORS
Filed March 29, 1965     2 Sheets-Sheet 2
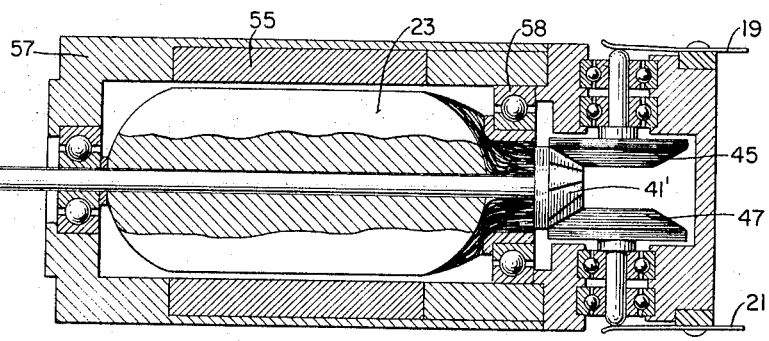
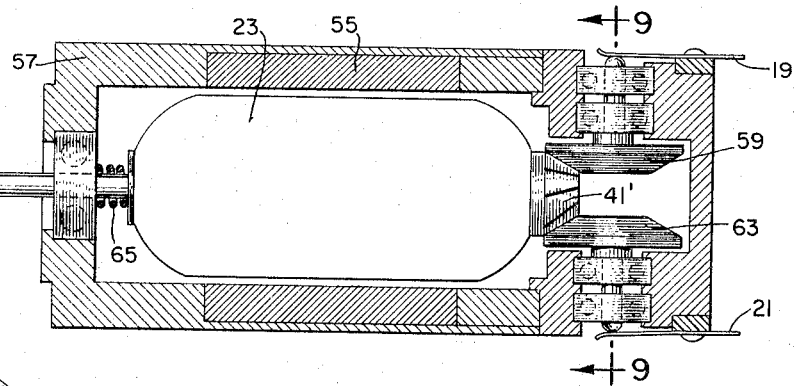
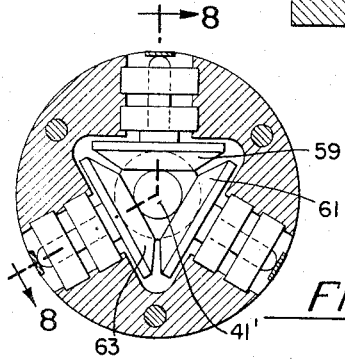
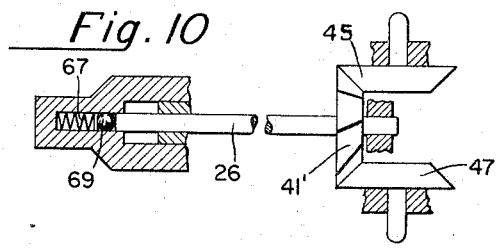
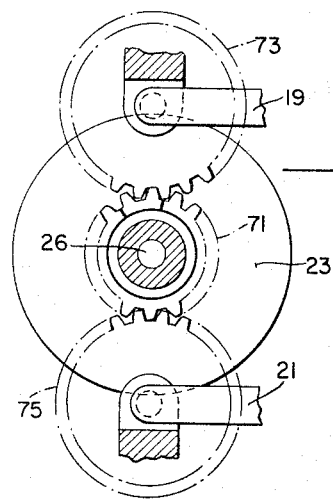
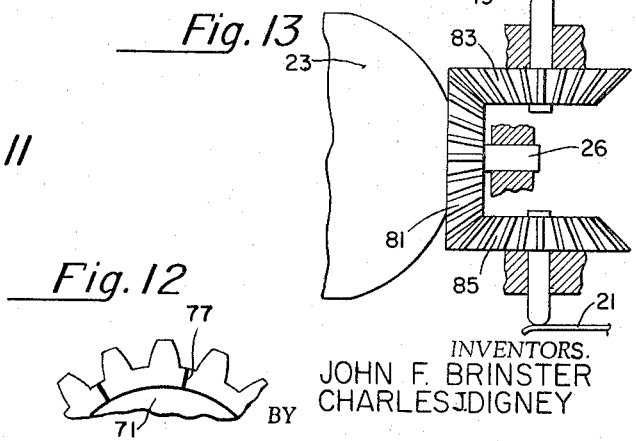
INVENTORS.
JOHN F. BRINSTER
CHARLES J. DIGNEY
BY
*Ralph K. Bonell*
AGENT

United States Patent Office 3,341,726
Patented Sept. 12, 1967

3,341,726
ROTATING BEARING CONTACTS FOR
ELECTRICAL COMMUTATORS
John F. Brinster, Princeton, and Charles J. Digney,
Kendall Park, N.J.
Filed Mar. 29, 1965, Ser. No. 443,572
2 Claims. (Cl. 310—90)

ABSTRACT OF THE DISCLOSURE

There are described various arrangements of rotatable members in rolling contact with a commutator, for example the commutator of a motor or generator, as substitutes for brushes in rubbing contact therewith. In one arrangement a plurality of rotatable members in rolling contact with a commutator in addition to providing an electrical connection or connections constitutes a bearing which replaces a shaft bearing.

---

This invention relates primarily to means for supplying current to the rotating armature of an electric motor or receiving current from the rotating armature of an electric generator by way of a segmented commutator, but is not limited to use in connection with such machines. In particular it refers to the use of rotatable electrically conductive members in rolling contact with the surface of a commutator in place of brushes in sliding contact therewith.

The conventional arrangement in a motor, for example, of brushes spring-biased to sliding contact with a commutator has a number of known disadvantages. Some of these are especially prominent in the operation of motors of small size which are required to supply only a slight driving torque but which must operate satisfactorily in the presence of shock or vibration. Motors driving airborne telemetry equipment are in this category.

An unavoidable consequence of the use of brushes in sliding contact with a commutator is brush wear. In small motors which are inaccessible for inspection or maintenance this may be a factor of considerable importance. Brush wear appears to be a result not only of the mechanical rubbing involved but also of the current carrying function of the brush and is accelerated by arcing at the commutator. One harmful feature of brush wear is that the abraded brush particles tend to adhere to the commutator. Particularly when metal brushes are used, these particles may form short circuits between adjacent commutator segments. With metal brushes another possibility under some conditions is welding between the brush and commutator. In the case of graphite brushes a bad feature, for certain applications, is the fact that brush wear (and the chance of complete brush disintegration) is markedly increased during operation under low atmospheric pressure, as at high altitudes.

In addition to wear, an aspect of conventional brush arrangements that becomes of importance when a motor, for example, is subject to shock or vibration is the fact that the combination of a displaceable brush and a biasing spring therefor constitutes an oscillatory system. There is thus a tendency, due to the inertia of the brush, for relative vibration to occur between the brush and commutator. The result is a variable contact resistance between these two members that is reflected as a variation in the voltage applied to the motor armature, which, in turn, gives rise to a variation in the speed of the motor. Under severe mechanical excitation of the motor a brush may, momentarily, completely leave the commutator.

A partial remedy for brush vibration is the use of a strong spring pressure. This, however, not only increases brush wear but, particularly in the case of graphite brushes, results in an increase in the rate of change of spring pressure as this more rapid wear occurs. Another undesirable effect of strong spring pressure where very small motors are concerned, for example motors designed to deliver less than an ounce-inch of torque, is the loss in torque it causes over and above the unavoidable loss due to the use of brushes under even light spring pressure. This loss, moreover, is a variable quantity.

The present invention by making use of an electrically conductive rotating member or members, or of members having an electrically conductive surface, in substantially pure rolling contact with the surface of a commutator as a means for conducting current to or from a rotating armature avoids the cited and other disadvantages of sliding brush contacts. The invention is disclosed herein as variants of two principal design modifications, these modifications involving, respectively, the rolling of smooth surfaces of revolution on one another and the rolling action, without sliding, that occurs between meshed gear teeth of suitable contour, the teeth in this case being formed respectively, in the surfaces of the commutator and the rotatable contact member or members.

In contrast to the conduction of current between members in pure rolling contact, as disclosed herein, devices are known in which the transmission of rotary motion inherently also involves sliding action. This is due to the fact that during rotation portions of the surface of one engaged member (commutator or rotatable contact) have a linear velocity different than that of the engaged portions of the surface of the other member, as a result of the form and mounting of the members. This inherent sliding makes these devices subject to the disadvantages that have been enumerated in connection with sliding brushes.

It is, then, an object of the invention to provide means for conducting electrical current between a stationary member and a rotating segmented commutator by way of a rotatable conductive member in continuous electrical contact with and rotated by the commutator, substantially through rolling action, only.

Another object is to provide means for conducting current between a stationary member and a rotating commutator which avoids the use of a member in total or partial sliding contact with the commutator.

Another object is to provide in an electric motor or generator means for supplying current to or receiving current from a rotating armature which comprises a segmented commutator and a rotatable electrically conductive member in continuous substantially pure rolling contact with the surface thereof.

Another object is to provide means of the foregoing character in which the rolling surfaces of the commutator and cooperative rotatable contact member are smooth surfaces of revolution.

Another object is to provide means of the foregoing character in which the surfaces of the commutator and cooperative rotatable contact member each comprises a toothed portion, said toothed portions being in mesh with one another and adapted to transmit motion from the commutator to the rotatable member with substantially pure rolling contact therebetween.

Another object is to provide in an electric motor or generator means for supplying current to or receiving current from a rotating armature and commutator which comprises a rotatable electrically conductive member in continuous substantially pure rolling contact with the commutator and biased at a substantially constant pressure, thereagainst.

A further object of the invention is to provide a bearing for a rotatable armature and commutator of an electric motor or generator constituted by rotatable conductive members in rolling contact with the commutator which have the added function of conducting current to or from the commutator and armature.

These and other objects and advantages of the invention will be more clearly apparent from consideration of the following specification describing preferred forms which the invention may take, and from consideration of the appended drawings in which:

FIG. 7 is a view, partly in section, of a complete motor assembly comprising a conical commutator and conical contact wheels in rolling contact therewith;

FIG. 8 is a sectional view of a motor, taken as indicated by line 8—8 of FIG. 9, in which conical contact wheels form a bearing for the commutator;

FIG. 9 is a sectional view taken as indicated by line 9—9 of FIG. 8;

FIG. 10 is a view of a motor or generator armature shaft mounting a conical commutator resiliently biased against conical contact wheels in rolling contact therewith;

FIG. 11 is a partial end view of a motor or generator armature and a shaft therefor bearing a cylindrical toothed surface commutator, together with cylindrical toothed surface contact wheels meshed therewith;

FIG. 12 is a detail of FIG. 11, to an enlarged scale; and

FIG. 13 is a partial view of a motor or generator comprising a conical toothed surface commutator and conical toothed surface contact wheels meshed therewith.

Figure 1:
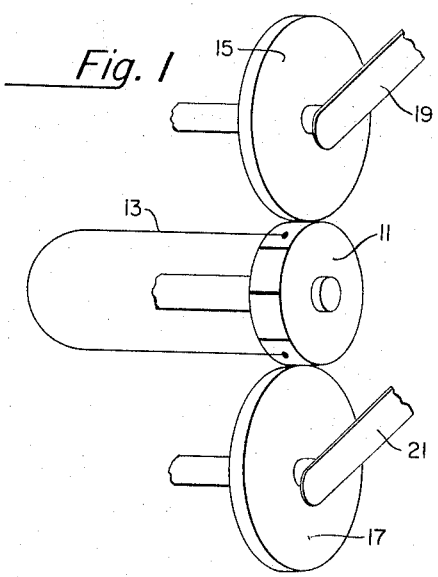
FIG. 1 is a schematic drawing showing a commutator for a motor or generator with an armature coil connected thereto and with contact wheels in rolling contact therewith, in accordance with the principles of the invention.

Referring, now, to the figures, FIG. 1 is a schematic drawing generally illustrating the principal concept of the invention. There is shown a rotatable commutator 11 having a surface comprising spaced electrically conductive segments to which the armature coils of a motor or generator are connected, as coil 13. Commutator 11 is in contact with and rotatably drives contact wheels or discs 15 and 17 which have uninterrupted or continuously electrically conductive contact surfaces. Contact springs 19 and 21, respectively in electrical connection with these surfaces, provide connections to stationary means, as, in the case of a motor, to a power source.

Figure 2:
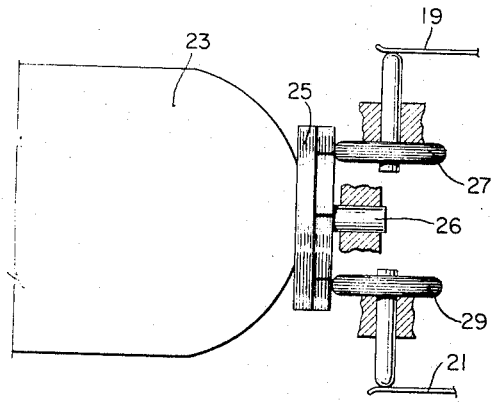
FIG. 2 is a partial view of a motor or generator comprising a flat-surface commutator with contact wheels in rolling contact therewith.
Figure 3:
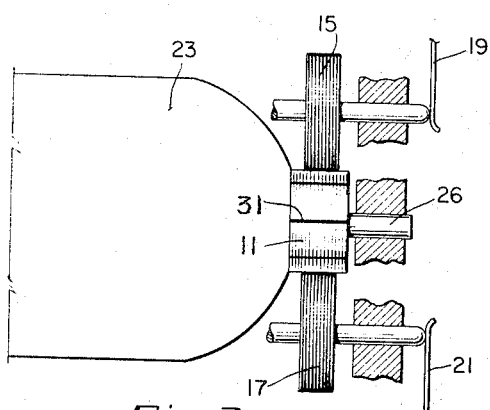
FIG. 3 is a similar view of a motor or generator comprising a cylindrical commutator with cylindrical contact wheels in rolling contact therewith.
Figure 4:
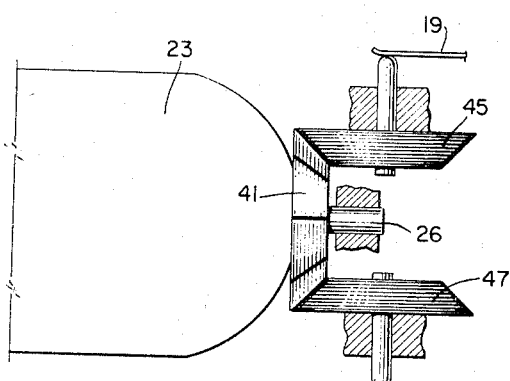
FIG. 4 is a similar view of a motor or generator comprising a conical commutator with conical contact wheels in rolling contact therewith.

FIGS. 2-4 illustrate the invention in more practical form, particularly that principal modification thereof which involves the rolling of one smooth surface of revolution on another. In FIG. 2, motor or generator armature 23 has electrical connections to flat surface commutator 25. Electrically conductive contact wheels 27 and 29 rotatable about axes perpendicular to that of the armature shaft bear on and are rotatably driven by the commutator. To avoid sliding action due to differences in the linear velocities of the engaged surfaces, the wheels bear on the commutator at one distance, only, from the axis of rotation of the commutator. This is accomplished by rounding or beveling their contact surfaces. Hence, only point contact is made between the two contacting members, which limits their current carrying capacity. The advantages of this design are its simplicity and low cost.

As an equivalent means, caged rotatable balls (not illustrated) may replace the contact wheels.

Figure 5:
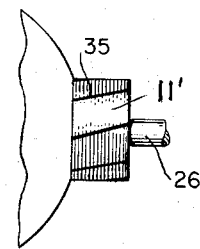
FIG. 5 is a partial view of a rotatable armature and a cylindrical commutator therefor comprising skewed insulating slots between the commutator segments.

FIG. 3, in which the members shown correspond generally, in form and arrangement to those in the schematic of FIG. 1, particularly illustrates the use of cylinders to secure line, instead of point, contact between the commutator and contact wheels, while maintaining pure rolling action. The engaged surfaces of cylindrical commutator 11 and conductive cylindrical contact wheels 15 and 17 are smooth surfaces. The segmentation of commutator 11 is by means of insulation-filled slots, as slot 31, extending in the direction of the axis of armature shaft 26. Certain advantages relative to this arrangement are obtained by skewing the slots, as illustrated in FIG. 5 by slot 35 in commutator 11'. For one thing, this avoids driving irregularities as the slots pass beneath the contact wheels. Moreover, with skewed slots a contact wheel short circuits adjacent commutator segments over a small angle of commutator rotation. This is the effect obtained in conventional designs by making the bearing surface of a brush wider than the slot width.

Figure 6:
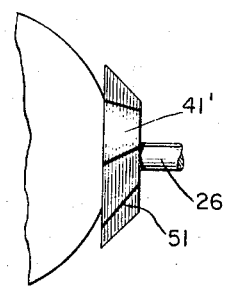
FIG. 6 is a partial view of an armature and a conical commutator having skewed slots.

Instead of employing rolling cylinders, line contact between smooth surfaces can be attained through the use of rolling cones. This design, as applied to the present invention, is illustrated in FIG. 4. Here conical commutator 41 has bearing on it, and frictionally drives, conical contact wheels 46 and 47. The commutator slots may either extend along elements of generation of the cone of which the commutator is a frustum, as seen in FIG. 4, or be skewed in relation thereto as seen in FIG. 6 for slot 51 of commutator 41'. For pure rolling action the axes of the conical contacts must intersect the axis of the commutator.

Both the cylinders of FIG. 3 and the cones of FIG. 4 are surfaces of revolution with respect to their axes of rotation.

FIG. 7 is a more complete showing of a motor utilizing the described arrangement of rolling cones for delivering electrical power from a stationary source to the armature. In this desgin 55 is a permanent magnet field while numeral 57 designates the non-ferrous frame of the machine. Commutator 41' has the skewed slots of FIG. 6.

The motor design shown in FIGS. 8 and 9 incorporates minor changes in the design of FIG. 7 but ones which have distinct advantages in certain applications. One such variation is that instead of two conical contact wheels three are used, equally spaced about the commutator. These wheels, 59, 61 and 63, thus are adapted, in addition to any current carrying function they may have, to constitute a rotative support or bearing for commutator 41' and associated armature 23 which takes the place of armature shaft bearing 58 of FIG. 7. The three-member bearing arrangement furnishes restraint against rotor or armature acceleration in all directions normal or perpendicular to the rotational axis. Then, too, FIG. 8 shows a loading spring 65, which maintains a pre-selected pressure between commutator 41' and wheels 59, 61 and 63. This use of a loading spring exerting a force along the axis of the armature shaft is not limited, however, to the case where the contact wheels form a bearing for the armature. In the fragmented showing of FIG. 10, for example, the force exerted by spring 67 on armature shaft 26 by way of ball 69 also maintains a selected biasing pressure between the conical commutator 41' and the two conical contact wheels 45 and 47, these co-acting members being in the relationship seen in FIG. 7.

One design consideration that is pertinent to all the arrangements of FIGS. 2-9 is the choice, for the driving commutator and the driven contact wheels, of materials that have a suitable coefficient of friction, relative to one another, to ensure substantially pure rolling action in their operation. With a copper alloy commutator the use of a graphite composition material (available with the required properties) for the contact wheels affords a satisfactory combination when used under suitable conditions. The slight (and otherwise unobjectionable) graphitic coating that the commutator acquired therefrom is an added advantage in that it serves as a protection from the effects of a corrosive atmosphere.

Besides the described contact arrangements making use of the rolling of one smooth surface on another, a second principal modification of the invention makes use of the rolling on one another of meshed gear teeth formed in the surfaces of those members by way of which an electrical connection is maintained. Rolling of one tooth surface on another is inherent in the driving engagement of suitably meshed gears having teeth of involute form, for example. Here, again there is line contact between the engaged surfaces to supply current carrying capacity and in this case a positive drive without reliance on friction to avoid slippage.

FIG. 11 shows, as an end view, a cylindrical commutator 71 in the surface of which gear teeth are formed, together with toothed contact wheels 73 and 75 meshed therewith. The commutator slots in this design preferably occur in portions of the commutator surface that do not take part in the engagement of the teeth. As an example, in the enlarged view of FIG. 12 slot 77 is located in the trough between two adjacent teeth. The engaged teeth may have any pitch and may be cut in accordance with any suitable type of gearing. Thus, they may be straight teeth, that is teeth extending in the direction of the axis of rotation of the member in which they are cut or, for smoother operation, they may have a helical extent.

Analagous to the rolling cones of FIG. 7 and possessing certain of the advantages thereof, bevel or miter gearing provides still another means for securing rolling action with line contact between contact wheel or wheels and commutator. This is illustrated by FIG. 13. In similar manner to the skewing of the commutator slots in FIG. 6, the teeth of commutator 81 and contact wheels 83 and 85 instead of extending along elements of generation of the conical surfaces of these members, as shown in FIG. 13, may be skewed relative thereto, with the commutator slots similarly skewed.

The disclosure herein of various forms which the invention may take is not intended to limit the scope of the invention, which is fully set forth in the following claims.

What is claimed is:

1. In an electric motor the combination of an armature and a commutator in electrical connection with the windings thereof, a shaft mounting said two members for rotation about the axis thereof, said shaft having a bearing in direct contact therewith only at the end thereof remote from said commutator, said commutator being of conical form in coaxial relation with said shaft and having a peripheral surface comprising spaced electrically conductive segments, a plurality of conical members greater than two rotatable about the axes thereof and respectively positioned for rolling contact between the peripheral surfaces thereof and said commutator surface at equally spaced angular locations about the latter surface, thereby to form a rotative bearing for the commutator and armature in lieu of a second shaft bearing, the said peripheral surface of at least one of said contact members being continuously electrically conductive, and means for conducting electric current from a stationary source to said last-named surface of the further conduction thereof to the commutator and armature windings.

2. The combination defined in claim 1 wherein the number of said plural conical members is three and wherein the axes of rotation of all such members intersects the axis of the conical commutators.

References Cited

UNITED STATES PATENTS

| 120,057 | 10/1871 | Gramme et al. | 310—219 XR |
| 399,329 | 3/1889 | Heywood | 310—219 |
| 520,152 | 5/1894 | Welch | 310—219 XR |
| 832,353 | 10/1906 | White | 310—219 |
| 1,375,161 | 4/1921 | Landers | 310—219 |
| 1,999,303 | 4/1935 | Sarbey | 310—219 XR |
| 2,275,827 | 3/1942 | Plensler | 310—219 XR |

FOREIGN PATENTS

| 207 | 1870 | Great Britain. |
| 1,065,579 | 5/1954 | France. |

MILTON O. HIRSHFIELD, *Primary Examiner.*

D. F. DUGAN, *Assistant Examiner.*